United States Patent [19]
Moody

[11] Patent Number: 5,458,403
[45] Date of Patent: Oct. 17, 1995

[54] FULL-FUNCTION VALVE WITH QUICK DRIVE AWAY FOR HEAVY DUTY SEMI-TRAILER BRAKE SYSTEMS

[75] Inventor: Michael J. Moody, Smithville, Mo.

[73] Assignee: Midland Brake, Inc., Kansas City, Mo.

[21] Appl. No.: 236,626

[22] Filed: Apr. 29, 1994

[51] Int. Cl.⁶ .................................................... B60T 13/00
[52] U.S. Cl. ................................. 303/7; 303/9; 303/9.76
[58] Field of Search ................................. 303/7, 9, 9.75, 303/9.76, 28, 40, 71, 9.61; 188/170

[56] References Cited

U.S. PATENT DOCUMENTS

| | | | |
|---|---|---|---|
| Re. 30,205 | 2/1980 | Carton et al. | 303/7 |
| 4,042,281 | 8/1977 | Ury | 303/29 |
| 4,080,004 | 3/1978 | Ury | 303/9 |
| 4,163,585 | 8/1979 | Ury | 303/9 |
| 4,182,535 | 1/1980 | Fannin | 303/9 |
| 4,472,001 | 9/1984 | Fannin | 303/9 |
| 4,593,954 | 6/1986 | Campanini | 303/7 |
| 4,915,456 | 4/1990 | Gross et al. | 303/9 |
| 5,236,250 | 8/1993 | Moody et al. | 303/7 |

*Primary Examiner*—Josie A. Ballato
*Attorney, Agent, or Firm*—St. Onge Steward Johnston & Reens

[57] ABSTRACT

A full function valve incorporating a proportioning valve module that initially directs supply air pressure during initial system charging to the spring brake chambers to prepare the spring brakes for prompt release when there is sufficient system supply air pressure to operate the service brakes. The proportioning valve module then opens to increase supply air pressure to the reservoir, while charging of the spring brake chambers continues, until the service brakes become operable and the spring brakes disengage.

14 Claims, 11 Drawing Sheets

FULL-FUNCTION VALVE WITH QUICK DRIVE AWAY FOR HEAVY DUTY SEMI-TRAILER BRAKE SYSTEMS

BACKGROUND OF THE INVENTION

1. Field of the Invention

This invention relates to an improved full-function brake valve for use in fluid braking systems used on the semi-trailers of heavy-duty highway tractor-trailer vehicle combinations. More specifically, it relates to a full-function brake valve which features a quick drive-away function.

2. Discussion of the Prior Art

To meet all of the emergency and service requirements of modern heavy-duty highway tractor-trailer combinations, while meeting all of the pertinent governmental regulations, including Federal Regulation FMVSS 121 (Docket 90-3, Notice 2), the trucking industry has resorted to a number of trailer semi-brake valve arrangements which have led to complexity, high costs, installation and maintenance difficulties and related problems.

FMVSS 121 is an important safety standard that applies to highway tractor-trailer rigs, and it requires that the spring brakes, which are spring loaded to engage the brake drums when the braking system air pressure drops below the required operating pressure necessary to operate the service brakes, become engaged within certain specified time periods. This provides emergency braking when the service brakes become inoperative.

In a typical semi-trailer braking system, a spring brake control valve may be employed to control the supply of pressurized air to the spring brakes to release them and also to exhaust air therefrom when the spring brakes are to be again applied. The brake system, however, must be designed so that the spring brakes are not released prematurely, that is, prior to pressurization of the reservoir for operating the service brakes. Safety considerations dictate that the service brake function be enabled by such reservoir pressurization prior to release of the spring brakes. However, it is also desirable that the braking system have a reasonably short period to become effective. Otherwise the user may be tempted to defeat the safety system to avoid long delays in start-up of a tractor-trailer rig.

Illustrative of the prior art is Gross et al. U.S. Pat. No. 4,915,456 and patents cited therein, i.e., Ury U.S. Pat. Nos. 4,042,281, 4,080,004 and 4,163,585; Fannin U.S. Pat. No. 4,182,535; and Carton et al. U.S. Pat. No. Re. 30,205 (Reissue of U.S. Pat. No. 3,922,064). Still other illustrative prior art includes Fannin U.S. Pat. No. 4,472,001 and Campanini U.S. Pat. No. 4,593,954 and the patents cited therein. U.S. Pat. No. 5,236,250, the disclosure of which is hereby incorporated by reference, discloses a full function valve of the type useful in this invention. None of these patents disclose or suggest a full-function valve having the features of safety and quick drive-away provided by the present invention.

OBJECTS OF THE INVENTION

It is an object of the present invention to provide within a single valve envelope an improved full-function brake valve for heavy-duty highway trailers which performs all of the required functions of a tractor trailer braking system and otherwise meets all of the requirements of the aforementioned Federal Regulation.

It is another object to provide a full-function brake valve system for heavy-duty highway semi-trailers which can become operational within a relatively short period from provision of supply air pressure to the braking system.

It is another object to provide a single, compact full-function brake valve which alone provides the requisite brake functions for a tandem axle semi-trailer including the safety feature of not releasing the spring brakes before enablement of the service brake function.

Other objects, aspects and features of the present invention in addition to those mentioned above will be pointed out in or will be understood from the following detailed description provided in conjunction with the accompanying drawings.

SUMMARY OF THE INVENTION

These objects are achieved by a single, unitary, full-function valve on the semi-trailer comprising a full-function valve body with multiple ports, including individual ports for fluid communication to the spring brake chambers, to the service brake chambers, to the trailer pressurized air reservoir and to exhaust; and individual ports for receiving pressurized control and supply air from respective sources thereof. The various ports and related communicating passageways within the valve body are disposed so as to communicate the control air for service brake control, and the supply air for charging pressurized air to the trailer air reservoir and the spring brake and service brake chambers of the air brake system, all responsive to a plurality of valve modules housed within the full-function valve body or envelope.

The present invention provides a proportioning valve module in fluid communication with the supply air, the reservoir, and with passageways to the spring brake chambers. The proportioning valve has a first mode of operation in which it provides a greater degree of supply air pressure to the spring brake chamber than to the reservoir supplying the service brake chambers, and a second mode of operation wherein supply air pressure to the reservoir supplying the service brake chambers is increased to be equal to the pressure supplied to the spring brake chamber.

In one embodiment, the first mode of operation provides a closed valve between the supply air and the reservoir and the second mode of operation provides an open valve thereat. In another embodiment, the first mode provides a partial supply air pressure to the reservoir, and the second mode provides a maximum supply air pressure to the reservoir.

BRIEF DESCRIPTION OF THE DRAWINGS

The present invention may be more clearly understood from the following description of a specific and preferred embodiment read in conjunction with the accompanying schematic and detailed drawings; wherein.

It should be understood that the drawings are not necessarily to exact scale and that certain aspects of the embodiments, particularly the functional schematics of FIGS. 2A–2E and 4–6, are illustrated by graphic symbols, schematic representations and fragmentary views. It should be also understood when referring to physical relationships of components by terms such as "upper", "lower", "upward", "downward", "vertical", "horizontal", "left", "right" or the like, such terms usually have reference to the orientation depicted in the drawings. Actual embodiments or installations thereof may differ, depending upon the particular semi-trailer for which the braking system is designed. It should also be understood that the term "passageway" is not necessarily limited to a tubular path or other regularly-shaped passage but also encompasses fluid communicating spaces, chambers and the like.

DETAILED DESCRIPTION OF DRAWINGS

Figure 1:
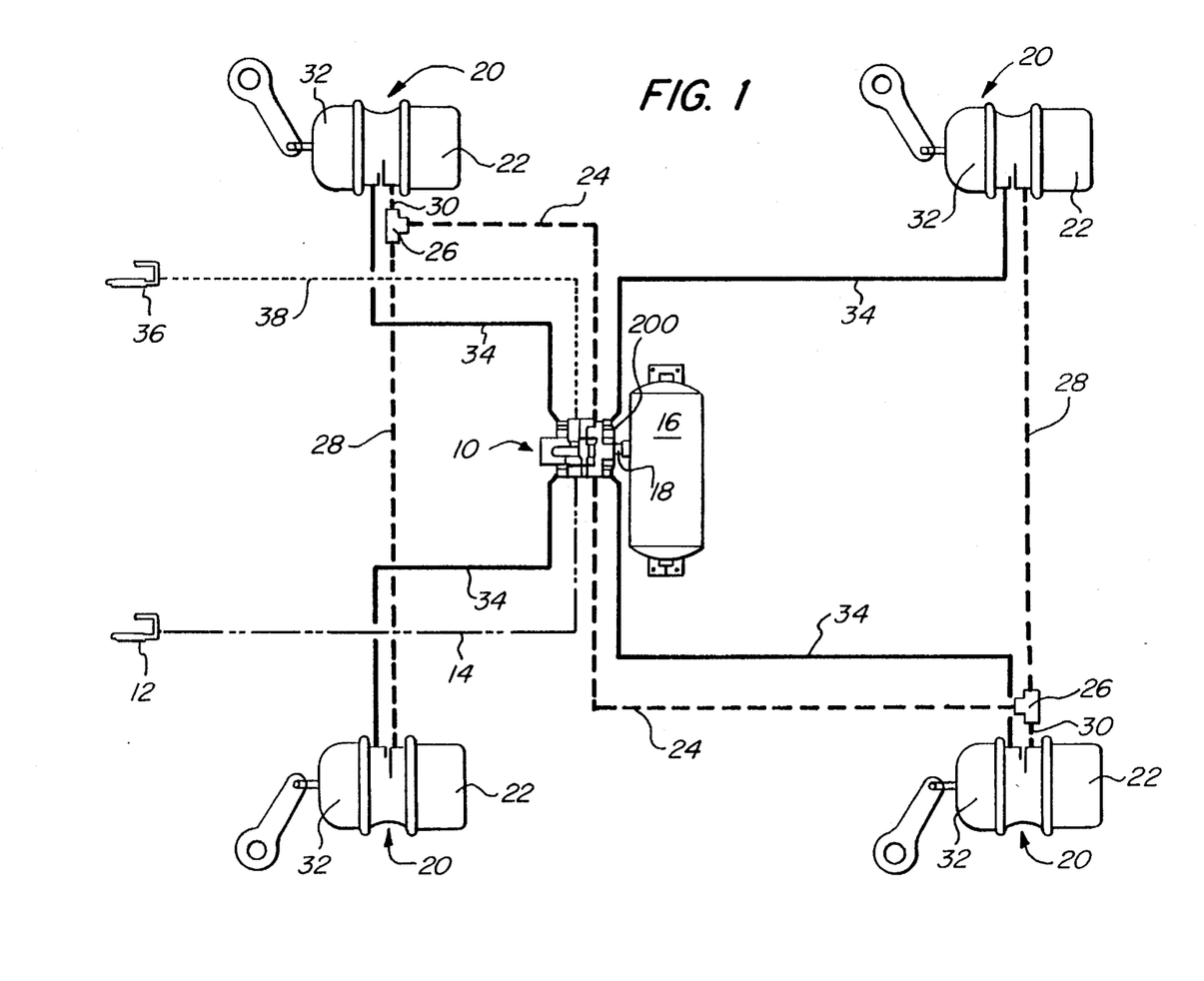
FIG. 1 is an overall schematic of a semi-trailer tandem brake system wherein a full-function valve with a proportioning valve for quick drive-away of the present invention is advantageously employed.

Referring to FIG. 1, the schematic represents a semi-trailer tandem brake system wherein the unitary full-function valve 10 with a proportioning valve 200 for quick drive-away in accordance with the present invention is used. Pressurized supply air, typically at about 125 psig, is received into the system from a supply source (not shown) of the tractor-trailer combination via trailer gladhand connector 12 and is communicated to full-function valve 10 via line 14.

The pressurized air is directed by valve 10 to reservoir (tank) 16 via line 18. Pressurized air is also directed by full-function valve 10 to the dual chambers of brake actuators 20, the spring (parking) brake chambers 22 thereof being in fluid communication with full-function valve 10 via lines 24, T-couplings 26 and lines 28 and 30, and the service brake chambers 32 thereof being in fluid communication with full-function valve 10 via lines 34. Control air from the tractor for controlling the service brakes is received via gladhand 36 and communicated to full-function valve 10 via line 38.

To differentiate the pressurized air which fills the reservoir and actuates the spring and service brakes from the pressurized air which controls the relay valve module, the former is referred to herein as supply air, and the latter as control air. Similarly, the respective ports are referred to as the supply port and the control port or, alternatively, as the supply air port and the control air port.

Initially, upon charging of the brake system, the spring brake chambers 22 of brake actuators 20 receive pressurized air through full-function valve 10 directly from the tractor (not shown) via gladhand connector 12 and line 14. The proportioning valve 200 prevents the reservoir 16 from receiving any supply air, or alternatively, permits the reservoir 16 to receive only a minimal flow of supply air during initial charging. Thereafter, flow to reservoir 16 is increased by the opening of proportioning valve 200. While shown as a single vessel or tank, reservoir 16 may take the form of a plurality of vessels in series or parallel, particularly if size and space limitations or configurations are factors.

In the following detailed descriptions of the schematics of full-function valve 10 in FIGS. 2A–2E, the same reference numerals are used so that the respective descriptions can be more readily related and understood.

Figure 2A:
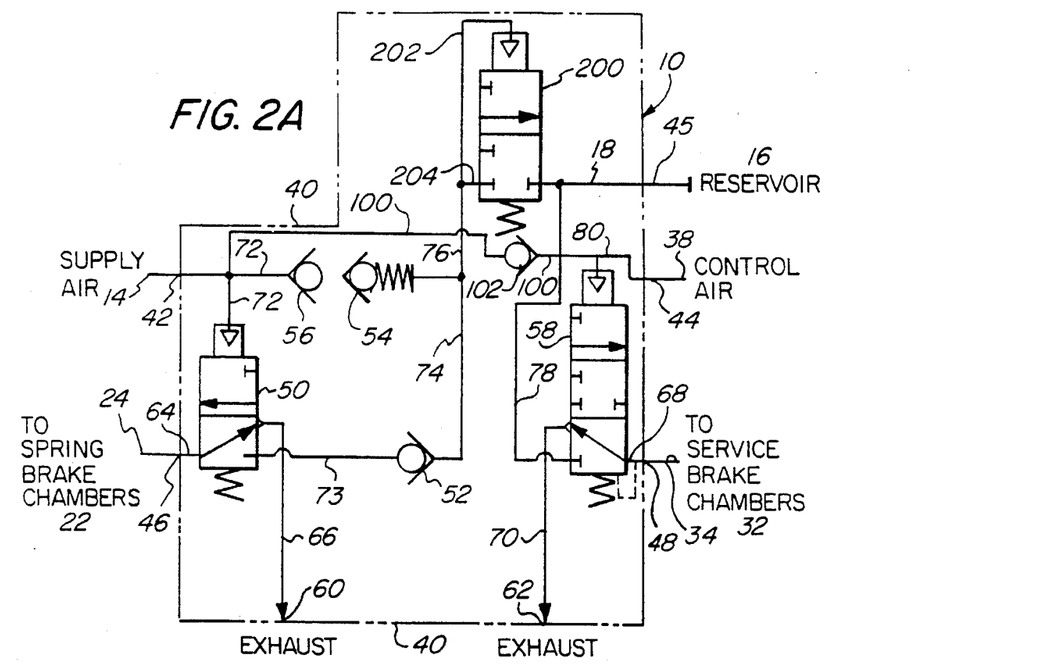
FIGS. 2A–2E are functional schematics of an embodiment of the full-function valve of the present invention illustrating various functional modes of the valve during the charging of the brake system and subsequent braking cycles.

Referring to FIG. 2A, unitary full-function valve 10 is shown schematically at rest. Supply line 14, control line 38, reservoir line 18, spring brake chamber line 24 and service brake chamber line 34 are all at atmospheric pressure. Supply air line 14 is connected to housing or body 40 of full-function valve 10 at port 42. Control air line 38 is connected to valve body 40 at port 44. Line 18 to reservoir 16 is connected to valve body 40 at port 45. Line 24 to the spring brake chambers 22 is connected to valve body 40 at port 46. Line 34 to the service brake chambers 32 is connected to valve 40 at port 48.

Unitary full-function valve 10 houses within body 40 a plurality of valve modules, namely, spring brake valve module 50 and associated one-way check valve 52, biased one-way pressure protection valve module 54 with associated one-way check valve 56, relay valve module 58, and proportioning valve module 200. The exhaust outlet in body 40 from spring brake valve module 50 is depicted at 60. The exhaust outlet in body 40 from relay valve module 58 is depicted at 62.

In the at-rest position, spring brake line 24, which is attached to port 46 of valve body 40, is connected by internal passageway 64, spring brake valve module 50 and internal passageway 66 to exhaust port 60, whereby the spring brakes are fully applied. The service brake line 34, which is attached to port 48 of valve body 40, is connected by internal passageway 68, relay valve module 58 and internal passageway 70 to exhaust port 62.

Other elements shown in FIG. 2A, may include passageways 72, 74, 76, 78, 80 and the anti-compounding feature shown comprising internal passageway 100 and one-way check valve 102, or, alternatively, the external counterparts to such passageway and valve. The anti-compounding feature is omitted in FIGS. 2B–2E to enhance clarity of the drawings.

Proportioning valve module 200 has an inlet side connected by passageways 204 and 76. Valve module 200 further includes a pressure actuation passageway 202. The outlet side of proportioning valve module 200 connects to line 18 to reservoir 16 and also connects to passageway 78 which connects to relay valve module 58.

Figure 2B:
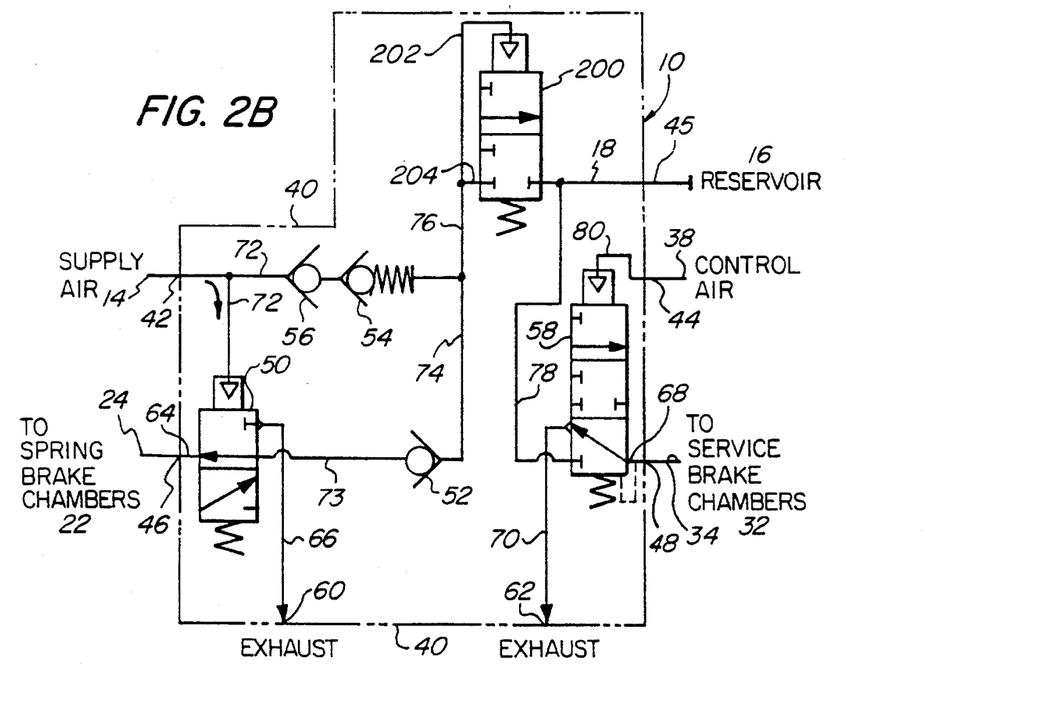

FIG. 2B shows full-function valve 10 after the pressure of the supply air in line 14, port 42 and internal passageways 72 has increased above a first predetermined pressure, typically about 40 psig, but is still below a second predetermined pressure, typically about 70 psig. In response to a pressure of at least about 40 psig in passageways 72 the piston of spring brake valve module 50 has shifted downwardly into the charging position.

Instead of being connected to the exhaust port, line 24, port 46, and internal passageway 64 are now connected via internal passageway 73 and one-way check valve 52 to internal passageway 74. Pressurized air, however, will not flow to the spring brakes via line 24 even though port 46 is now connected via passageway 64, module 50, passageway 73, check valve 52 and passageway 74. The pressure in passageway 72 is not available because biased pressure protection valve module 54, which requires a pressure differential of about 70 psig to open, is closed.

Similarly, pressure in passageway 72 is not available to either proportioning valve 200 or reservoir 16 because pressure protection valve module 54 is closed.

Figure 2C:
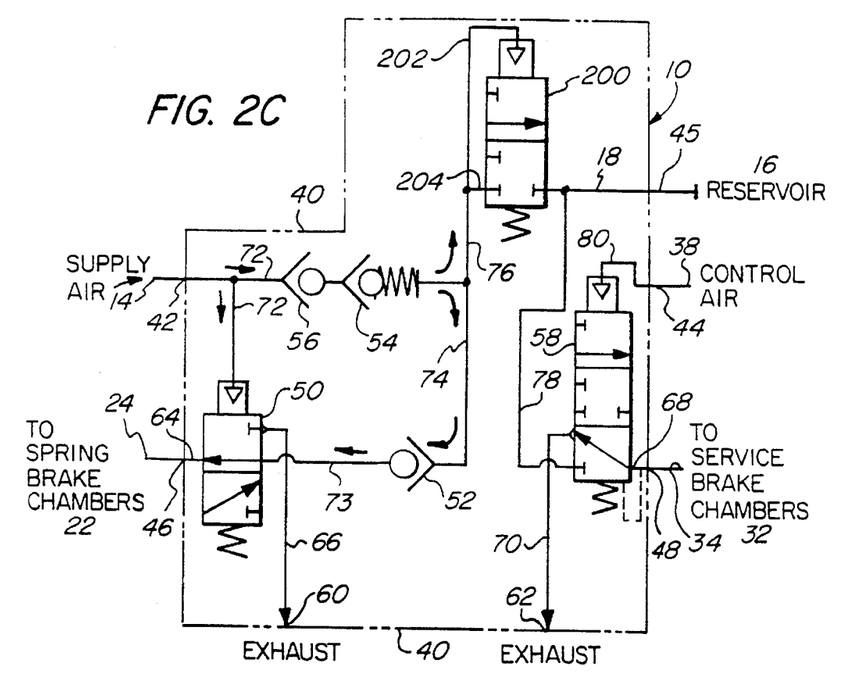

FIG. 2C shows full-function valve 10 with pressurized air in the supply line 14, port 42, and passageway 72 greater than the second predetermined pressure, typically about 70 psig. The biased one-way pressure protection valve module 54 and associated one-way check valve 56 are now open, and pressurized air is flowing into spring brake chambers 22 via passageways 74, one-way check valve 52 (which is now open to let the air through), passageway 73, spring brake valve module 50, passageway 64, port 46 and line 24. However, pressurized air is not yet being delivered to reservoir 16 or service brake chambers 32 because proportioning valve module 200 remains closed.

Proportioning valve module 200 as shown in FIG. 2C is in its first mode, wherein supply air pressure is provided to spring brake chambers 22. Proportioning valve module 200 is closed, and therefore supply air pressure is not provided to reservoir 16, or being made available to relay valve module 58 and service brake chambers 32 via passageways 78 and 68.

Proportioning valve module 200 opens when the pressure in passageway 202 reaches a predetermined pressure, to provide supply air pressure to reservoir 16. In a preferred embodiment, proportioning valve 200 opens when the pressure in passageway 202 is between about 200 psig. It is to be appreciated that this event may occur subsequent to partial pressurization of the spring brake chambers 22.

Preferably, proportioning valve 200 opens when the pressure in spring brake chamber 22 is about 50 to about 80 percent of the operating pressure, and most preferably, between about 60 to about 75 percent of the operating pressure. The operating pressure is typically between 100 to 125 psig. The operating pressure may be set at 100 psig, in which case the proportioning valve will open when the pressure in the spring brake chambers is between about 50 to about 80 psig, and most preferably between about 60 to about 75 psig. Testing may be done on particular systems to determine relationship between the pressure in the spring brake chamber and passageway 203. For purposes of this application it is assumed that during charging of the brake system the pressure in passageway 202 is in equilibrium with the pressure in the spring brake chambers.

Proportioning valve 200 has two preferred embodiments. In one preferred embodiment, shown schematically in FIG. 4, proportioning valve 200 is either fully shut or fully open depending on the system conditions. In an alternative embodiment shown in FIG. 5, proportioning valve 200' has low flow and high flow conditions corresponding respectively to the fully shut (no flow) and fully open (high flow) conditions of the embodiment of FIGS. 2A–2E.

Figure 5:
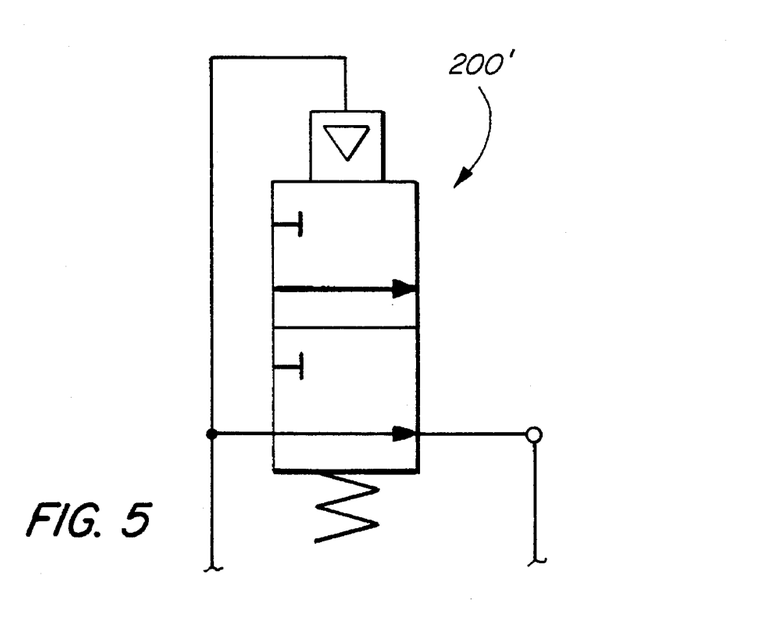
FIG. 5 is a schematic showing an alternative embodiment of the proportioning valve.

In the alternative embodiment of FIG. 5, the proportioning valve 200' in the low flow mode preferably provides supply air pressure to reservoir 16 at a pressure equal to about 50% of the pressure of the supply air provided to spring brake chambers 22. When the pressure of supply air in passageway 202 reaches about 70 psig, the proportioning valve 200' opens to its high flow mode. In the high flow mode, supply air is delivered to reservoir 16 at a pressure which is about equal to the pressure at which supply air is delivered to spring brake chambers 22.

It is to be appreciated that while the invention operates to provide proportional pressurization of the reservoir and the spring brake chambers, control of pressurization is linked to air flow; consequently, the invention could be described in alternative terms as a full function valve having a proportioning valve for proportioned control of air flow to the reservoir and spring brake chambers.

The spring brake chambers 22 are not fully pressurized prior to enablement of the service brake system by the pressurization of reservoir 16. The spring brakes are not released until the pressure in reservoir 16 is sufficient to actuate the service brakes. Otherwise, circumstances could develop whereby a trailer would have no capacity for braking.

When the air pressure in the spring brake chambers equals the supply air pressure, one-way check valve 52 will close, retaining the pressure in spring brake chambers 22. This will partially isolate the pressure in the spring brake chambers 22 from the variations in air pressure in the remainder of the trailer brake system. This will also prevent the pressurized air in the spring brake chambers 22 from escaping in the event of a failure of reservoir 16 or associated lines.

Figure 2D:
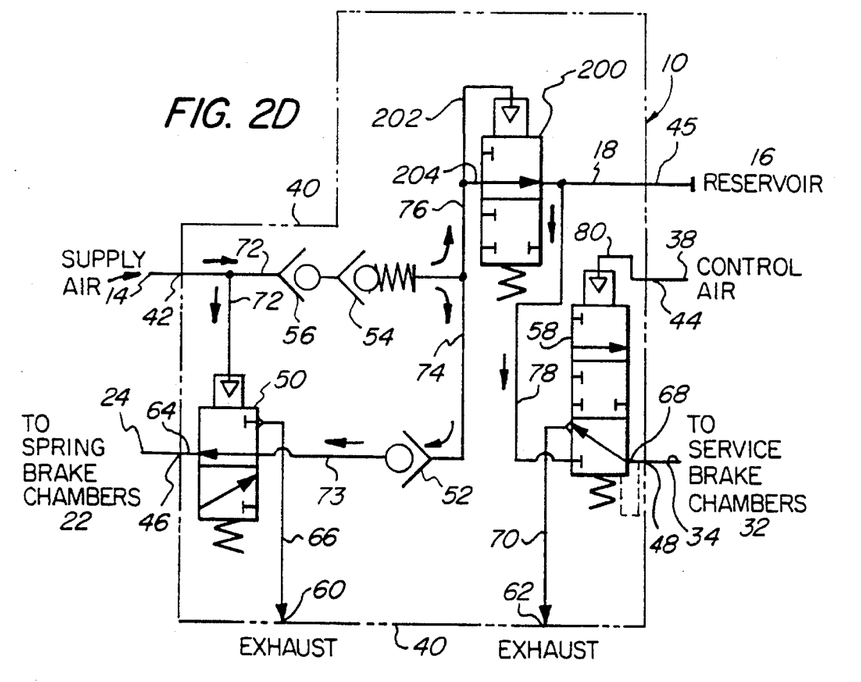
Figure 2E:
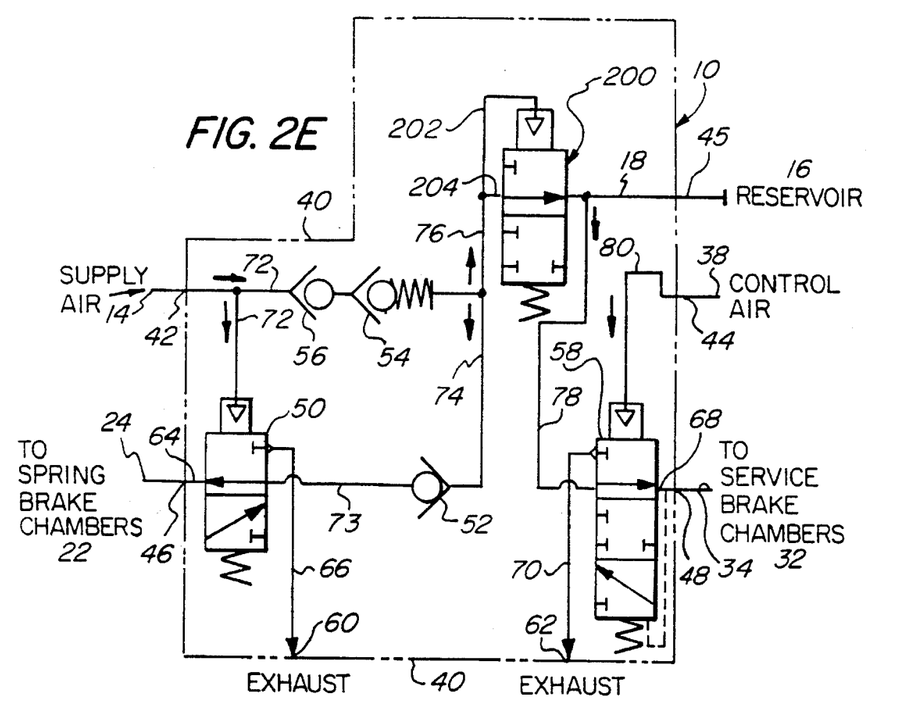

Schematic FIG. 2E shows full-function valve 10 when service brake control air is supplied via line 38, port 44 and passageway 80 to the piston of relay valve module 58. As shown schematically, the module shifts and communicates pressurized air from reservoir 16 (and supply air under some circumstances) to the service brake chambers 32 via line 18, port 45, passageways 76 and 78, module 58, passageway 68, port 48 and line 34. This results in application of the trailer service brakes in a known manner.

Figure 3:
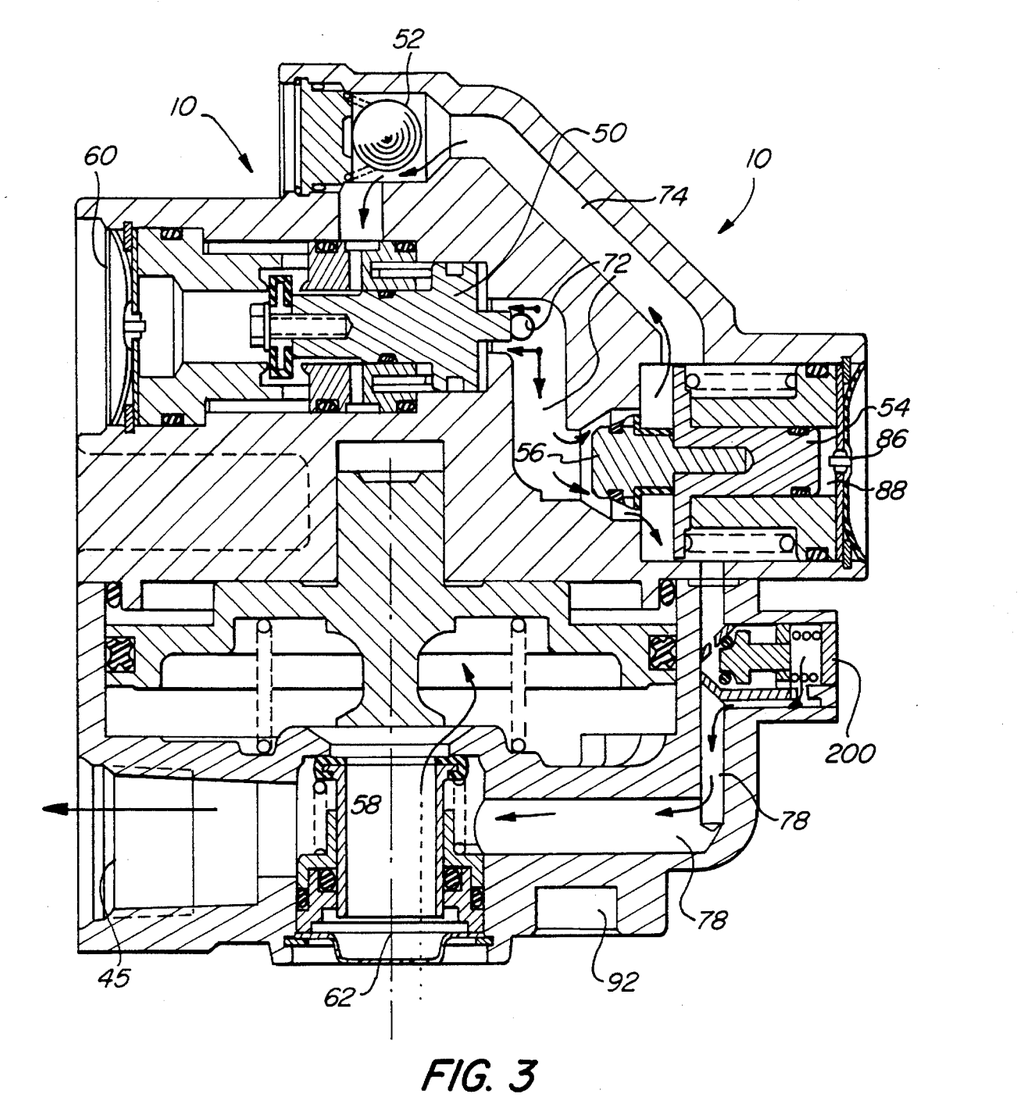
FIG. 3 is a cross-sectional view of an embodiment of a full function valve shown schematically in FIGS. 2A–2E.
Figure 4:
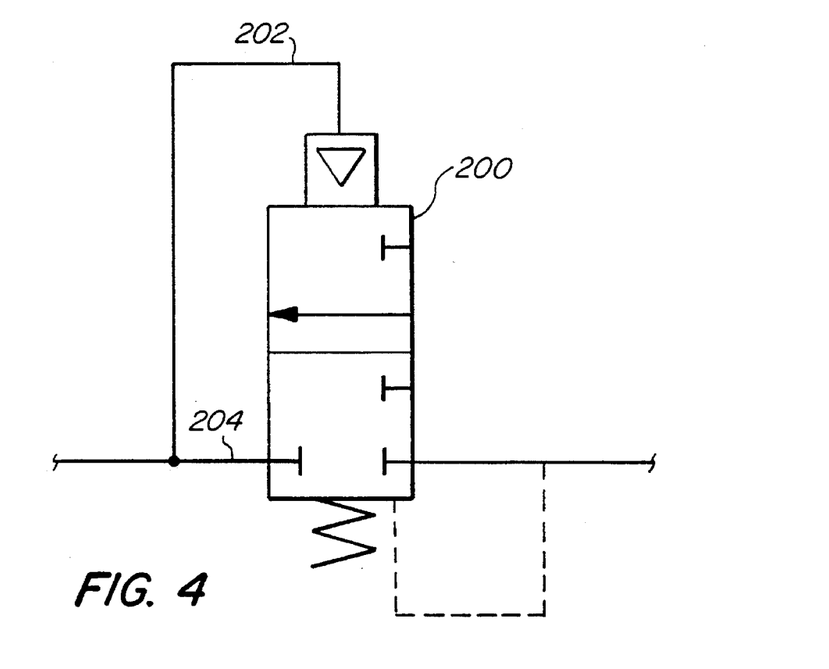
FIG. 4 is a schematic showing a preferred embodiment of the proportioning valve.

FIG. 3 shows a cross-section of a full function valve 10 with proportioning valve module 200 in a system condition corresponding to the schematic drawing shown in FIG. 2D. As can be seen, supply air pressure provided in passageway 72 through a transverse passageway (not shown) causes spring brake valve module 50 to shift left, permitting supply air flow from passageway 72 to pass valves 56, 54 and 52 to reach spring brake module 50 to deliver supply air through a traverse passageway (not shown) to spring brake chambers 22. Simultaneously, proportioning valve 200 has opened to permit delivery of supply air from passageway 72 via valves 56, 54 and valve 200 to passageway 78, and thence to reservoir 16 via port 45.

Figure 6:
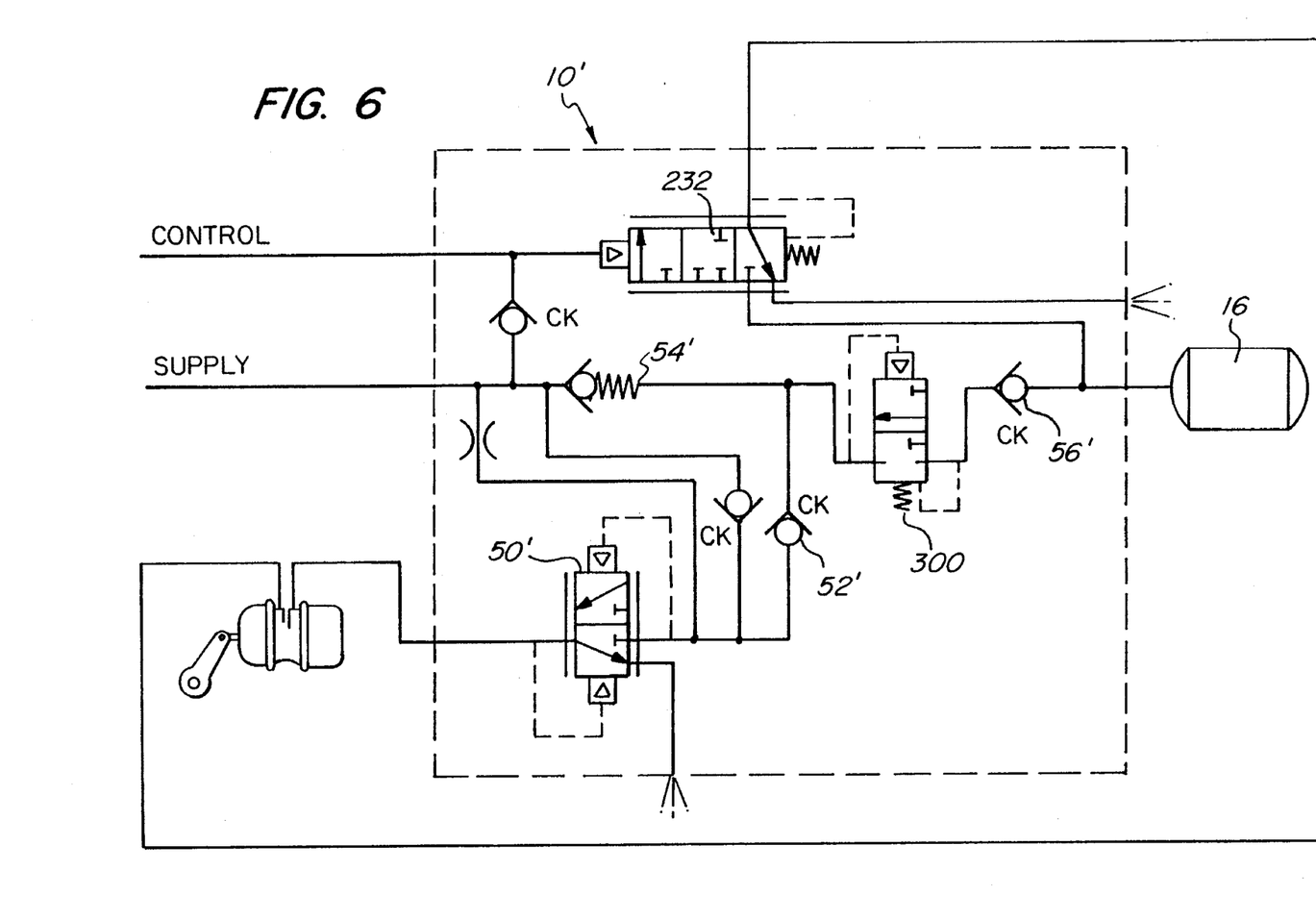
FIG. 6 is a functional schematic of a preferred embodiment of the full function valve of the present invention.

FIG. 6 schematically shows a proportioning valve 300 installed in another embodiment of a full function valve 10' of the type disclosed in U.S. patent application Ser. No. 08/149,287, filed Nov. 9, 1993, in the names of Wallestad and Koelzer, the disclosure of which is hereby incorporated by reference. The proportioning valve 300 provides the same functions as previously described in reference to proportioning valve 200 of FIGS. 2A–5.

FIGS. 7–10 show an embodiment of proportioning valve 300 installed in the full function valve 10' shown schematically in FIG. 6. Full function valve 10' includes a pressure protection valve 54' and a spring brake chamber quick release valve 50'. In FIGS. 7–10 proportioning valve 300 is combined with pressure protection valve 54'. Referring now to FIGS. 7–10, proportioning valve 300 comprises a flat metal disk 324 that is retained by a spring 332 to the end 322 of pressure protection valve 54'. Disk 324 floats freely. A post 328 limits movement of disk 324. A piston sleeve 334 surrounds disk 324 and sealingly receives the end 322 of pressure protection valve 54' into one end thereof. Piston sleeve 334 has external seals 336, and a disk seat 338 for receiving disk 324.

Figure 7:
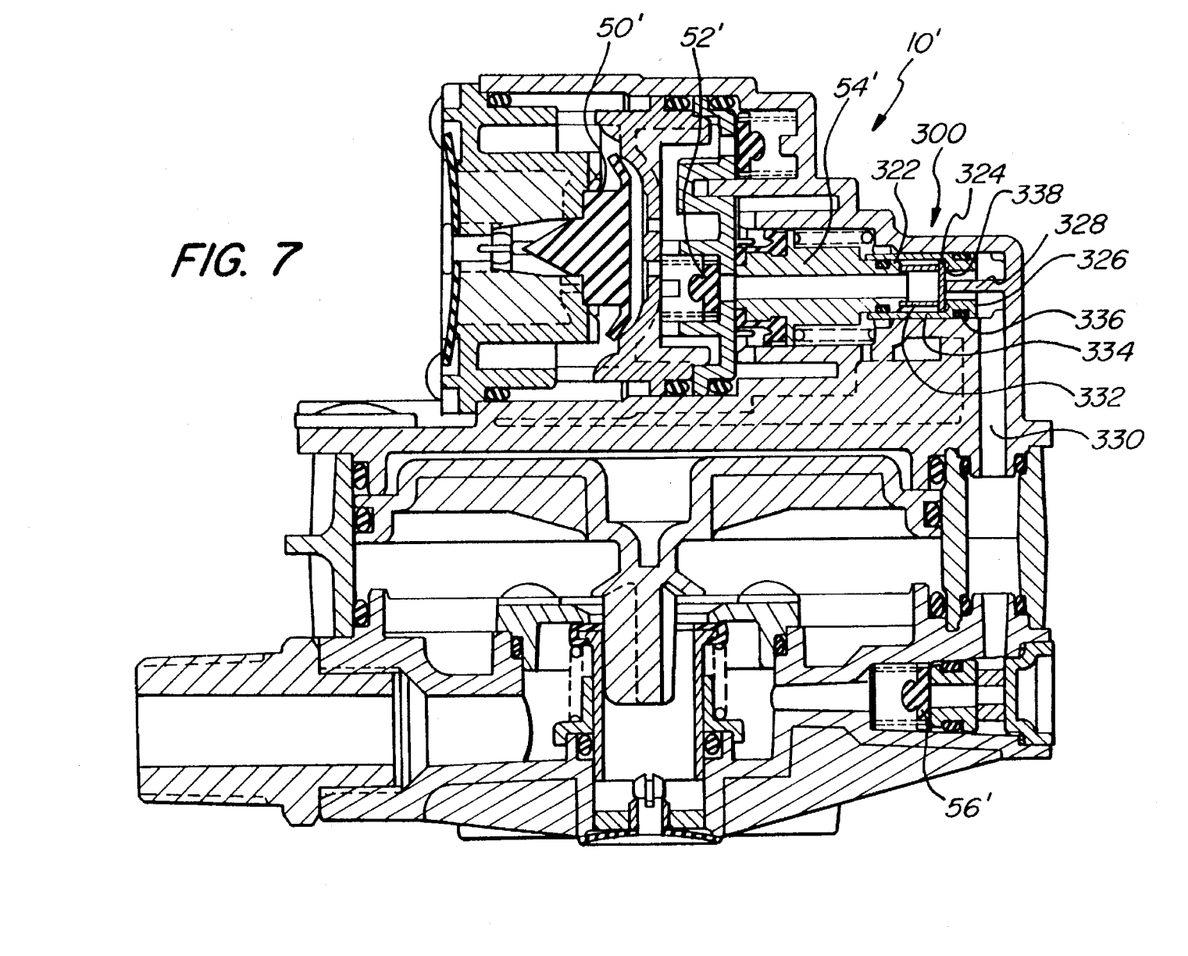
FIG. 7 is a cross-sectional view of a preferred embodiment of a full function valve shown schematically in FIG. 6.

FIG. 7 shows the valve 10' prior to pressurization with supply air. Proportioning valve 300 is at rest, with spring 332 locating disk 324 against post 328.

Figure 8:
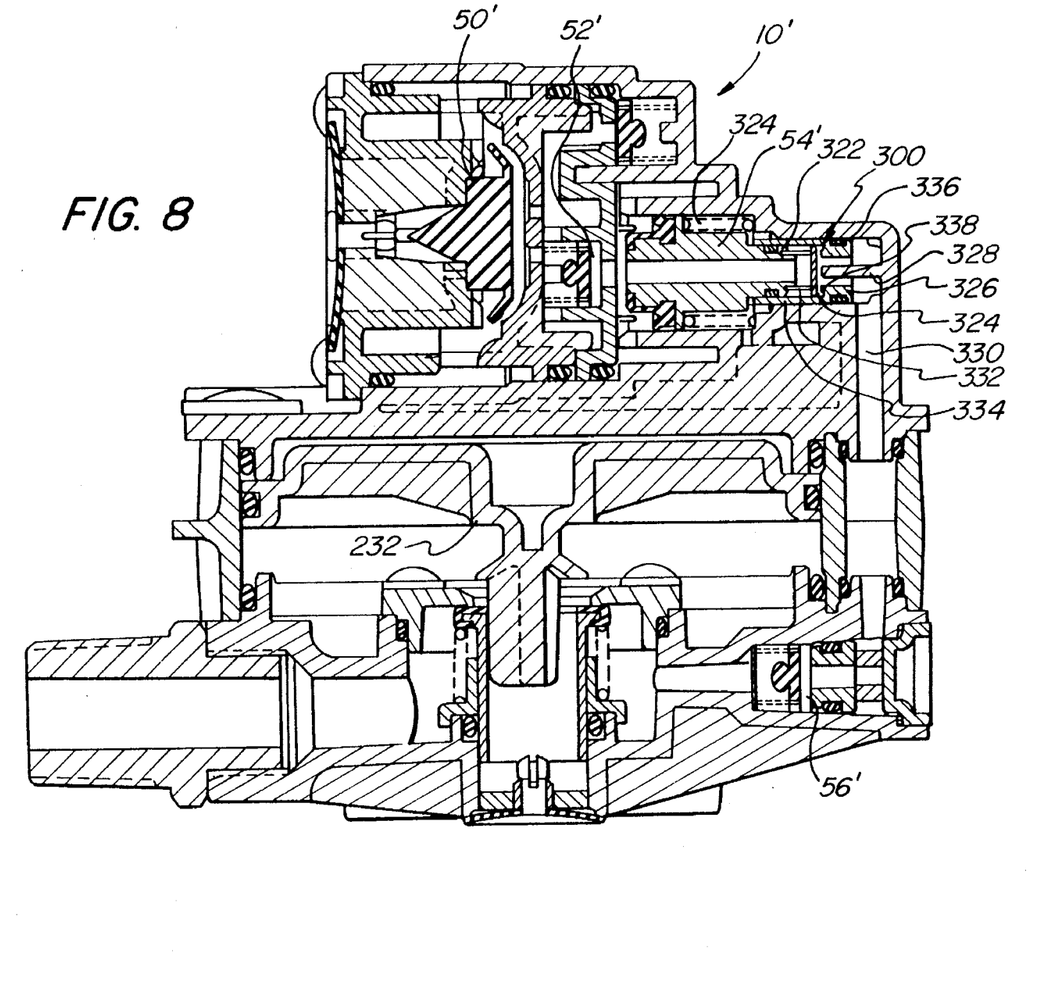
FIGS. 8–10 are cross-sectional views of the preferred embodiment of FIG. 7, showing operation of the full function valve as supply air is provided to the full function valve.

FIG. 8 shows an initial stage of brake pressurization in which supply air pressure is being provided to valve 10', and pressure protection valve 54' is open. Supply air pressure is provided at a maximum pressure and flow rate to the spring brake chambers from pressure protection valve 54' via check valve 52' and quick release valve 50'. Supply air is provided to the service brake reservoir at a minimum pressure and flow rate via proportioning valve 300 and check valve 56'. A minimum pressure and flow rate is provided because the proportioning valve 300 does not fully seal. It permits an intermittent provision supply air pressure and airflow into passage 330 leading to reservoir check valve 56' and thence to the reservoir. The intermittent pressurization occurs because disk 324 will flutter between a closed position as shown in FIG. 7, and an open position, as shown in FIG. 8. The proportioning valve 300 thus provides a 0.5:1.0 ratio between the pressure in the reservoir and the pressure in the spring brake chambers during the initial pressurization stage shown in FIG. 8.

Figure 9:
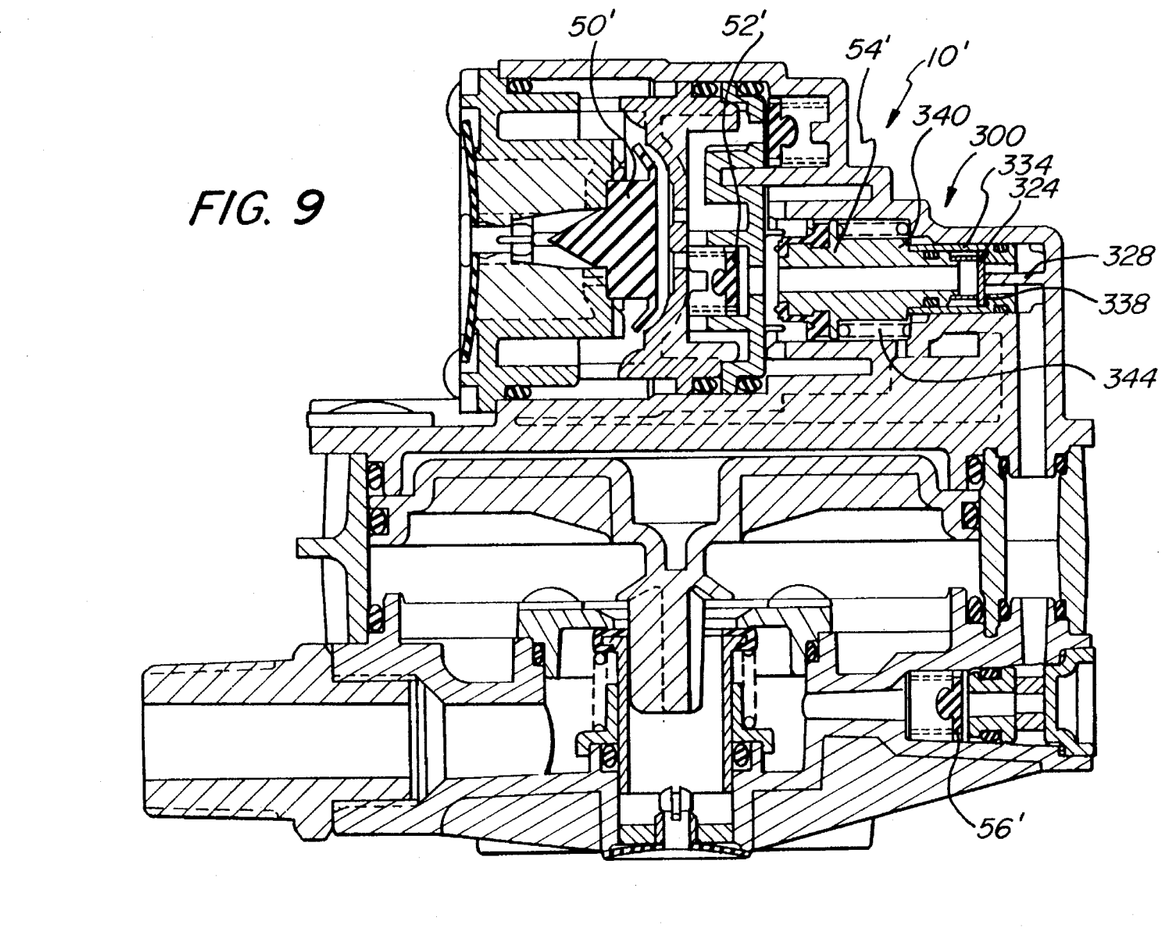

FIG. 9 shows a transition stage of brake pressurization in which the spring brake chamber has become partially pressurized and the proportioning valve is shifting from a 0.5:1.0 to a 1:1 pressure ratio. At this stage there is a greater pressure in the spring brake chambers than in the reservoir. In FIG. 9, the pressure in the spring brake chambers, and consequently on the left side 342 of pressure protection valve 54', has increased sufficiently to overcome the bias of pressure protection valve spring 344. The pressure protection valve 54' has shifted towards the right until the shoulder 340 contacts the left side of piston sleeve 334.

Figure 10:
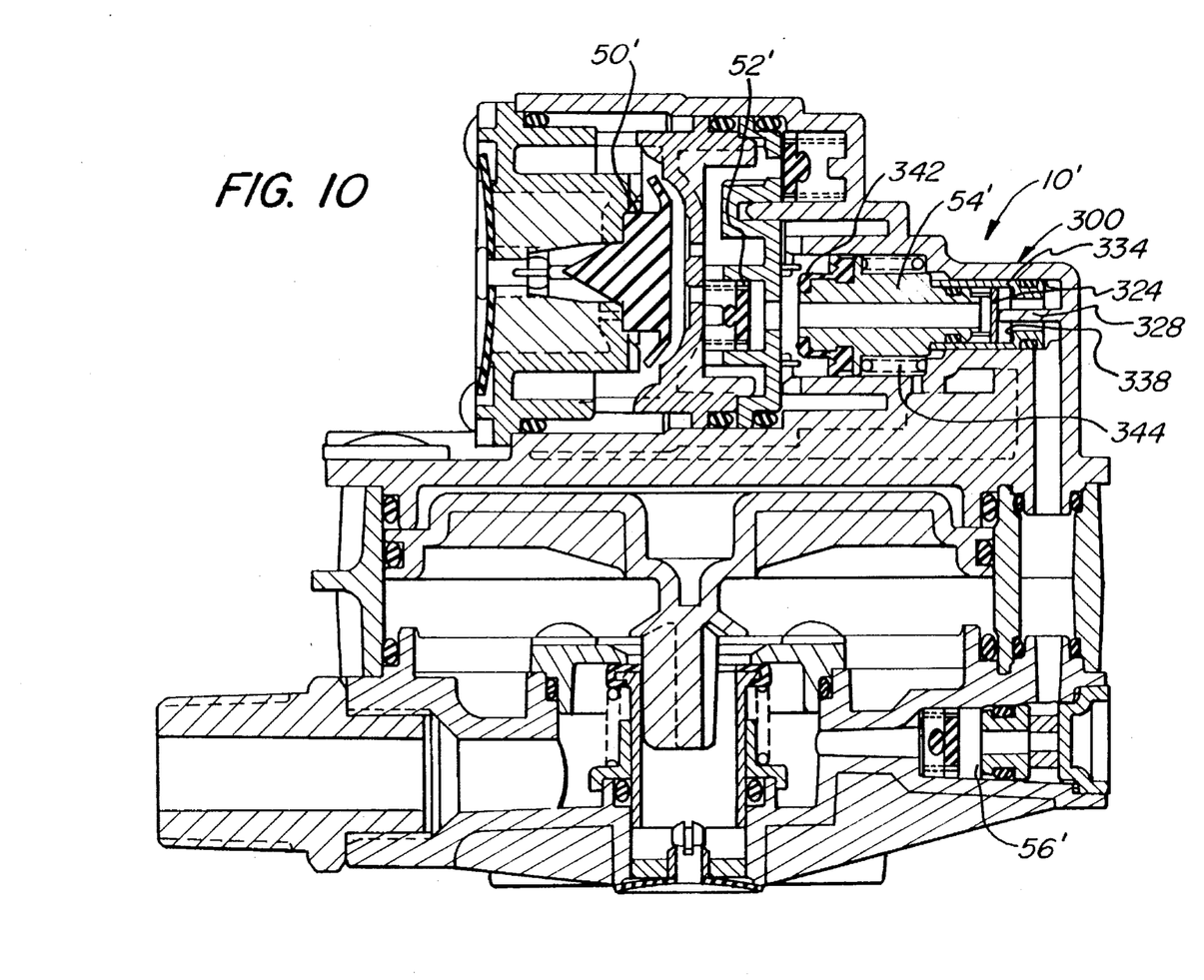

FIG. 10 shows the stage of brake pressurization where the proportioning valve 300 is providing a 1:1 ratio of pressure to the spring brake chamber and pressure to the reservoir. In FIG. 10, the pressure in the spring brake chambers, and consequently on the left side 342 of pressure protection valve 54', has further increased such that pressure protection valve 54' has shifted further to the right. As a consequence, piston sleeve 334 is also displaced to the right side of FIG. 10. As can be seen, disk 324 is prevented from further displacement by post 328, so that disk 324 no longer is seated in the disk seat 338, and proportioning valve 300 is fully open. Consequently, supply air pressure is equally distributed between the spring brake chambers and the service brake reservoirs.

SUMMARY OF OPERATION

Referring now to FIGS. 1–10, supply air enters valve 10,10'. As the supply air pressure increases to 70 psig, the pressure protection valve module 54,54' will open. The pressurized air entering the spring brake chambers will be from either the reservoir of the trailer, if there is pressurized air present, or from the supply port via pressure protection valve module 54,54', or both. As a result of this arrangement, pressurized air cannot go directly from the supply line into the spring brake chambers. This forecloses the possibility of the trailer being moved without service brake capability, a critical safety feature.

As indicated, supply air must reach a certain pressure, e.g., about 70 psig, before it can open the pressure protection valve module 54,54'. Once the module is opened, the pressurized air then can fill the spring brake chambers at a higher pressure than the reservoir. When the spring brake chambers are charged to the desired pressure, in the range of 20–40 psig, the proportioning valve module 200 will open to charge reservoir 16 at the same pressure as the spring brake chambers.

When the reservoir is charged to about 35 psig, the service brakes can be applied through the operation of the relay valve module. Control air signals from the tractor enter the relay valve module and act on the piston in a conventional manner. This piston actuates the valve module, allowing air from reservoir to fill the service brake chambers of the brake actuators, resulting in brake application through conventional mechanical means.

Typically, the service brakes will be operable at about 35 psig, and the spring brakes will release when the pressure in the spring brake chambers is greater than 70 psig. Consequently, the entire braking system will become fully operable even though the system is not yet fully charged, permitting quick drive-away. The system will continue to charge during the initial portion of the drive.

The invention permits the simultaneous proportionate filling of the reservoir and the spring brake chamber at a ratio of 0.5 to 1 (reservoir pressure to spring brake pressure) from 0 to about 70 psig spring brake pressure. At spring brake pressures above 70 psig, no proportioning occurs and the pressure in the reservoir goes from about 35 psig (50 percent of 70 psig) to 70 psig and from that point, both the reservoir and spring brake pressures increase together to the operating pressure.

Full-function valve 10 thus provides a quick drive-away feature, yet prevents drive-away prior to having adequate service brake capacity.

Because most modern-day trailer brake systems employ pressurized air as the fluid medium for actuation and control purposes and such use is contemplated in the presently-known best-mode embodiment described herein, the disclosure herein set forth assumes such medium to be used. As those skilled in the art will recognize, however, the invention is not necessarily limited thereto and the inventive concept may be adapted to other fluid media.

As is apparent from the above description, the full-function valve of the present invention copes with the operating and safety requirements of modern semi-trailers. It meets the requirements of present pertinent Federal Regulations and does so by advantageously integrating various valve functions within a single space-saving and cost-saving envelope or housing, thereby eliminating a complexity of multiple valves and interconnecting lines. It provides quick drive-away yet prevents drive-away before the service brakes are operable.

I claim:

1. In a unitary full function valve having a valve body with multiple ports, including individual ports for fluid communication to a spring brake chamber, a service brake chamber, to a reservoir and to exhaust, and for receiving pressurized supply air and control air, said ports being in communication by passageways and valves so as to connect:

supply air to said spring brake chamber, when said supply air is at a predetermined pressure, supply air and air stored in said reservoir to said service brake chamber, when said supply air is at said predetermined pressure and said control air is at a selected pressure;

the improvement comprising:

a proportioning valve module in communication with said supply air and said reservoir, said proportioning valve module having a first mode of operation for limiting the pressurization of said reservoir by supply air during an initial charging period while providing full pressurization of said spring brake chamber by said supply air, said proportioning valve module having a second mode of operation for providing an increase in pressurization of said reservoir when said spring brake chamber has been partially pressurized.

2. A unitary full function valve in accordance with claim 1, wherein said proportioning valve module enters its second mode of operation when an inlet pressure at said proportioning valve module reaches a pressure selected such that said reservoir has a reservoir air pressure sufficient to operate a service brake operably connected with said service brake chamber when said spring brake chamber has a spring brake chamber air pressure sufficient to release a spring brake operably connected with said spring brake chamber.

3. A unitary full function valve in accordance with claim 2, wherein said proportioning valve module comprises a closed valve in its first mode of operation whereby supply air is prevented from delivery to said reservoir, and an open valve in its second mode of operation whereby supply air is provided to said reservoir.

4. A unitary full function valve in accordance with claim 2, wherein said proportioning valve module comprises a valve with a partial valve opening in its first mode of operation, whereby said reservoir is pressurized by supply air at a proportionally lower pressure than the pressure of said spring brake chamber, and with a full valve opening in its second mode of operation, whereby supply air is delivered to said reservoir at a relatively higher pressure than in said first mode.

5. A unitary full function valve, comprising:
a valve body with multiple ports, including individual ports for fluid communication to a spring brake chamber, a service brake chamber, to a reservoir and to exhaust, and for receiving pressurized supply air and control air, said ports being in communication by passageways with a spring brake release valve, a pressure protection valve, and a proportioning valve module;

said spring brake release valve being in communication with said supply air, and being operable at a first predetermined supply air pressure to connect a port leading to said spring brake chamber from an exhaust port to said supply air, said pressure protection valve being in line with said supply air, said pressure protection valve being biased to open at a second predetermined pressure to connect said supply air with said proportioning valve module and with said spring brake release valve and said spring brake chamber, said proportioning valve module being in communication with said supply air and said reservoir by passageways, said proportioning valve module having a first mode of operation for limiting pressurization of said reservoir by said supply air during an initial charging period while providing full pressurization of said spring brake chamber by said supply air, and said proportioning valve module having a second mode of operation for providing an increase in pressurization of said reservoir and service brake chamber when said spring brake chamber has been partially pressurized with supply air.

6. A unitary full function valve in accordance with claim 5, wherein said proportioning valve module enters its second mode of operation when an inlet pressure at said proportioning valve module reaches a pressure selected such that said reservoir has a reservoir air pressure sufficient to operate a service brake operably connected with said service brake chamber when said spring brake chamber has a spring brake chamber air pressure sufficient to release a spring brake operably connected with said spring brake chamber.

7. A unitary full function valve in accordance with claim 6, wherein said proportioning valve module comprises a closed valve in its first mode of operation whereby supply air is prevented from delivery to said reservoir, and an open valve in its second mode of operation whereby supply air is provided to said reservoir.

8. A unitary full function valve in accordance with claim 6, wherein said proportioning valve module comprises a valve with a partial valve opening in its first mode of operation, whereby said reservoir is pressurized by supply air at a lower pressure than the pressure of said spring brake chamber, and with a greater valve opening in its second mode of operation, whereby supply air is delivered to said reservoir at a relatively higher pressure than is delivered to said reservoir in said first mode.

9. A unitary full function valve in accordance with claim 6, further comprising a relay valve operably connected to said control air and operable when said control air is at a predetermined pressure to connect said reservoir to said service brake chambers to engage service brakes operably connected with said service brake chamber.

10. A unitary full function valve in accordance with claims 2 or 6, wherein said proportioning valve module opens to connect said supply air to said reservoir to provide a maximum rate of pressurization of said reservoir at a proportioning valve module inlet pressure selected such that a pressure in said spring brake chamber is about 50 percent to about 80 percent of a preselected brake system operating pressure.

11. A unitary full function valve in accordance with claim 10, wherein said proportioning valve module opens when the pressure in the spring brake chambers is between about 50 to about 80 psig.

12. A unitary full function valve in accordance with claim 10, wherein said proportioning valve module opens to connect said supply air to said reservoir at an inlet pressure selected such that a pressure in said spring brake chamber is about 60 percent to about 75 percent of a preselected brake system operating pressure.

13. A unitary full function valve in accordance with claim 10, wherein said proportioning valve module opens when the pressure in the spring brake chambers is between about 60 to about 75 psig.

14. A unitary full function valve in accordance with claims 2 or 6, wherein said proportioning valve module is biased to be in its first mode of operation.

* * * * *